(12) United States Patent
Lee (10) Patent No.: US 8,570,960 B2
(45) Date of Patent: Oct. 29, 2013

(54) APPARATUS AND METHOD FOR UPLINK SCHEDULING IN WIRELESS COMMUNICATION SYSTEM

(75) Inventor: Seung-Do Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 450 days.

(21) Appl. No.: 12/657,886

(22) Filed: Jan. 29, 2010

(65) Prior Publication Data

US 2010/0195591 A1 Aug. 5, 2010

(30) Foreign Application Priority Data

Jan. 30, 2009 (KR) .................. 10-2009-0007464
Jan. 28, 2010 (KR) .................. 10-2010-0007958

(51) Int. Cl.
*H04W 4/00* (2009.01)
(52) U.S. Cl.
USPC ....................................................... 370/329
(58) Field of Classification Search
USPC ......... 370/203, 204–215, 229–240, 241–253, 370/310–337, 338–350, 395.1, 395.3, 370/395.4, 395.41, 395.42, 395.5, 395.52, 370/395.53, 412–421, 431–457, 458–463, 370/464–497, 498–529
See application file for complete search history.

(56) References Cited

U.S. PATENT DOCUMENTS

| 6,990,195 | B1 * | 1/2006 | LeBlanc et al. | 379/406.08 |
| 7,864,798 | B2 * | 1/2011 | Chandra et al. | 370/466 |
| 8,112,091 | B2 * | 2/2012 | Chun et al. | 455/450 |
| 2006/0039319 | A1 * | 2/2006 | Lee et al. | 370/328 |
| 2006/0245352 | A1 * | 11/2006 | Kang et al. | 370/229 |
| 2008/0228878 | A1 * | 9/2008 | Wu et al. | 709/205 |
| 2009/0073959 | A1 * | 3/2009 | Xu | 370/352 |
| 2011/0194502 | A1 * | 8/2011 | Sung et al. | 370/329 |

OTHER PUBLICATIONS

R.R. Goodman, "Program of the Seventy-Seventh Meeting of the Acoustical Society of America," Bellevue-Stratford Hotel, Philadelphia, PA, Apr. 8-11, 1969, vol. 46, No. 1 (Part 1), pp. 76-126.

* cited by examiner

Primary Examiner — Jung-Jen Liu (57) ABSTRACT

An apparatus is capable of reducing an overhead caused by a mute section in a wireless communication system that provides a Voice over Internet Protocol (VoIP) service. In the method, one or more terminals for providing the VoIP service during a next time section are determined. Mute section set information of a current time section and the next time section for the one or more terminals is determined. An amount of a resource of the next time section is allocated to at least one terminal whose next time section is not set to a mute section, wherein the amount of resource of the next time section is based on whether the current time section is set to a mute section or not set to a mute section.

20 Claims, 6 Drawing Sheets

APPARATUS AND METHOD FOR UPLINK SCHEDULING IN WIRELESS COMMUNICATION SYSTEM

CROSS REFERENCE TO RELATED APPLICATION(S) AND CLAIM OF PRIORITY

The present application claims the benefit under 35 U.S.C. §119(a) of a Korean patent application filed in the Korean Intellectual Property Office on Jan. 30, 2009 and assigned Serial No. 10-2009-0007464, and an application filed in the Korean Intellectual Property Office on Jan. 28, 2010 and assigned Serial No. 10-2010-0007958, the contents of which are incorporated herein by reference.

TECHNICAL FIELD OF THE INVENTION

The present invention relates to an apparatus and a method for providing a Voice of Internet Protocol (VoIP) service in a wireless communication system. More particularly, the present invention relates to an apparatus and a method for reducing an overhead caused by a mute section in a wireless communication system that provides a VoIP service.

BACKGROUND OF THE INVENTION

In the case of providing a VoIP service, according to P. T. Brady, "A method for generating ON-OFF speech patterns in two way conversations," Bell syst. Technology Journal, vol. 48, pp. 2445-2472, September, 1969, an exponentially distributed ON-OFF system includes a section $T_{ON}$ for substantially transmitting/receiving a VoIP packet, and a mute section $T_{OFF}$ that does not transmit/receive a VoIP packet.

A base station allocates a resource so that a terminal may transmit/receive a VoIP packet during a VoIP service section. However, a terminal that provides a VoIP service transmits/receives a VoIP packet substantially during only a section $T_{ON}$ of a VoIP service section. Therefore, a resource allocated to the mute section $T_{OFF}$ included in the VoIP service section is wasted.

SUMMARY OF THE INVENTION

To address the above-discussed deficiencies of the prior art, it is a primary object to provide at least the advantages described below. Accordingly, an aspect of the present invention is to provide an apparatus and a method for reducing resource waste caused by a mute section in a wireless communication system that provides a VoIP service.

Another aspect of the present invention is to provide an apparatus and a method for scheduling an uplink resource using a resource of a mute section in a wireless communication system that provides a VoIP service.

Still another aspect of the present invention is to provide an apparatus and a method for reducing resource waste of a terminal caused by a mute section at a base station that provides a VoIP service.

Yet another aspect of the present invention is to provide an apparatus and a method for scheduling an uplink resource using a resource of a mute section of a terminal at a base station that provides a VoIP service.

Further, another aspect of the present invention is to provide an apparatus and a method for allocating a minimum resource to a mute section of a terminal at a base station that provides a VoIP service.

Still yet another aspect of the present invention is to provide an apparatus and a method for transmitting mute section information at a terminal that provides a VoIP service.

In accordance with an aspect of the present invention, a method for allocating a resource at a base station of a wireless communication system that provides a Voice over Internet Protocol (VoIP) service is provided. The method includes determining one or more terminals for providing a VoIP service during a next time section, determining mute section set information of a current time section and the next time section for the one or more terminals, and allocating an amount of a resource of the next time section to at least one terminal whose next time section is not set to a mute section, wherein the amount of resource of the next time section is based on whether the current time section set to a mute section or not set to mute section.

In accordance with another aspect of the present invention, an apparatus for allocating a resource at a base station in a wireless communication system that provides a Voice over Internet Protocol (VoIP) service is provided. The apparatus includes a receiver that receives a signal, a controller that determines one or more terminals for providing the VoIP service during a next time section, and determines mute section set information of a current time section and the next time section for the one or more terminals, and a resource allocation unit that allocates an amount of a resource of the next time section to at least one terminal whose next time section is not set to a mute section, wherein the amount of resource of the next time section is based on whether the current time section set to a mute section or not set to mute section.

In accordance with still another aspect of the present invention, a method for transmitting mute section set information at a terminal of a wireless communication system that provides a Voice of Internet Protocol (VoIP) service is provided. The method includes determining whether VoIP connection with a serving base station is activated during a next time section, when the VoIP connection with the serving base station is activated during the next time section, determining mute section set information of a current time section and the next time section, and transmitting the mute section set information of the current time section and the next time section to the serving base station.

In accordance with yet another aspect of the present invention, an apparatus for transmitting mute section set information at a terminal of a wireless communication system that provides a Voice of Internet Protocol (VoIP) service is provided. The apparatus includes a controller that, when VoIP connection with a serving base station is activated during a next time section, determines mute section set information of a current time section and the next time section, and a transmitter that transmits the mute section set information of the current time section and the next time section to the serving base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Exemplary embodiments of the present invention provide a technique for utilizing a resource of a mute section in a wireless communication system that provides a VoIP service.

In the case of providing a VoIP service, an exponentially distributed ON-OFF system includes a section $T_{ON}$ for substantially transmitting/receiving a VoIP packet, and a mute section $T_{OFF}$ that does not transmit/receive a VoIP packet during a VoIP service section. That is, a wireless communication system that provides a VoIP service sets a mute section $T_{OFF}$ that does not transmit/receive a VoIP packet depending on a characteristic of voice communication in order to raise a bandwidth efficiency of a network. For example, the ON-OFF system sets $1/\lambda$ in a mean on-time to a section $T_{ON}$ for substantially transmitting/receiving a VoIP packet, and sets $1/\mu$ to a mute section $T_{OFF}$. Here, the $\lambda$ is frequency of $T_{ON}$ and the $\mu$ is frequency of $T_{OFF}$.

Figure 1:
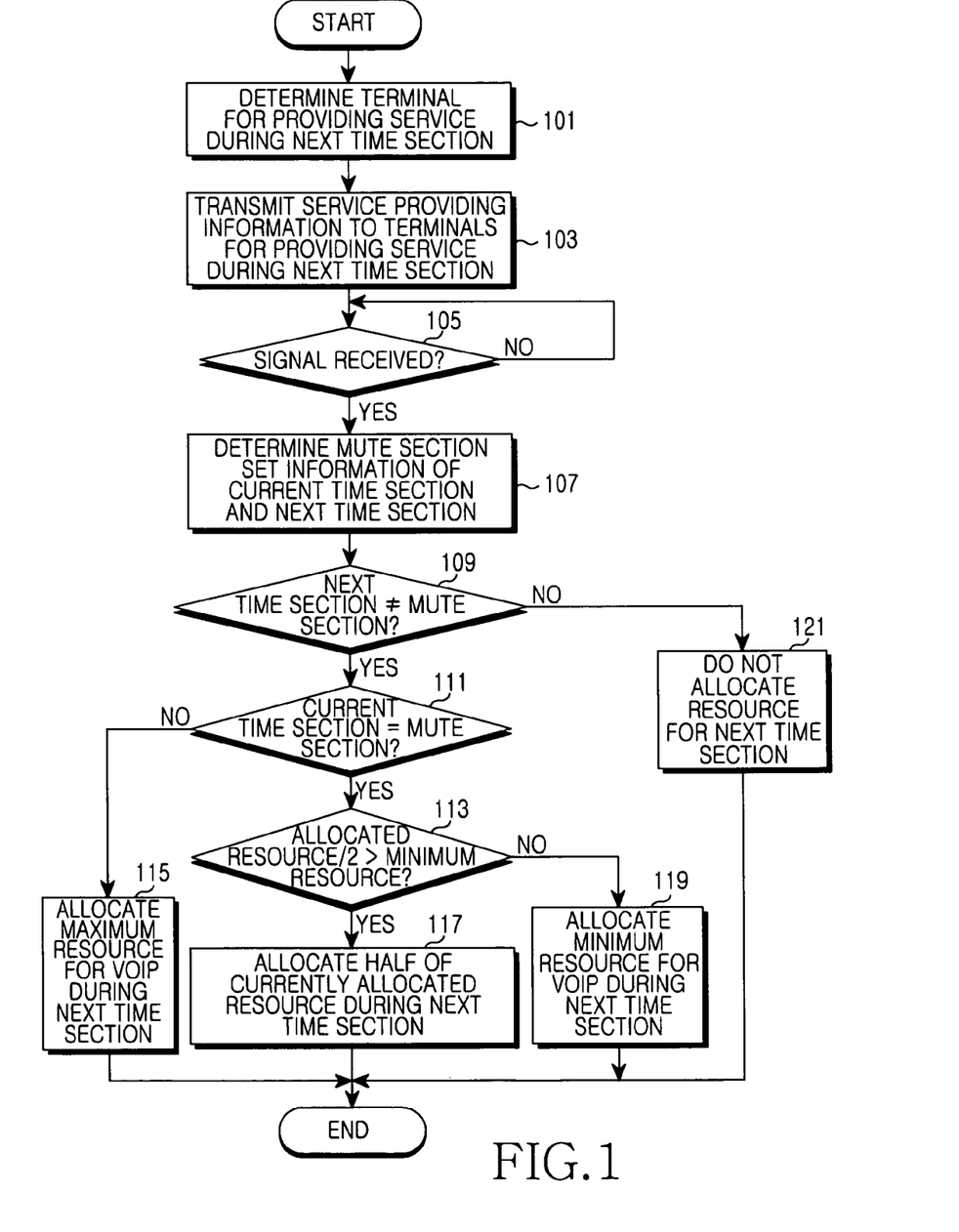
FIG. 1 illustrates a procedure for allocating a resource using a resource of a mute section at a base station that provides a VoIP service according to an exemplary embodiment of the present invention.

A base station allocates a minimum resource to a terminal during a mute section in order to reduce an overhead caused by a resource of the mute section as illustrated in FIG. 1. In the case of providing a VoIP service, the base station allocates a fixed resource to a terminal that provides the VoIP service. At this point, the base station may reduce resource waste caused by the mute section by minimizing a resource allocated to the terminal during the mute section as illustrated in FIG. 1.

FIG. 1 illustrates a procedure for allocating a resource using a resource of a mute section at a base station that provides a VoIP service according to an exemplary embodiment of the present invention.

Referring to FIG. 1, the base station determines terminals for providing a VoIP service during the next time section through scheduling in step 101. That is, the base station determines the terminals for which VoIP connection is to be activated during the next time section.

After determining the terminals for providing the VoIP service during the next time section, the base station transmits scheduling information to the terminals for providing the VoIP service in step 103. For example, the base station informs the terminals for providing the VoIP service during the next time section of whether VoIP connection is activated during the next time section. At this point, the base station informs whether the VoIP connection is activated using a residual bit of a generic Media Access Control (MAC) header. For another example, the base station may inform the terminals of whether the VoIP connection is activated using a new message representing whether the VoIP connection is activated.

The base station determines whether signals are received from terminals located in a service area in step 105.

When signals are received from the terminals, the base station determines mute section set information of the terminals for a current time section and the next time section from the signals in step 107. For example, the base station determines mute section set information of each terminal using mute section set field of an MAC header. For another example, the base station determines mute section set information of each terminal using a mute section control message provided from the each terminal.

The base station determines whether a terminal whose next time section has been set to a mute section $T_{OFF}$ exists among the terminals whose signals have been received in step 109.

When the terminal whose next time section has been set to the mute section $T_{OFF}$ exists, the base station does not allocate a resource for the VoIP service of the next time section to the terminal whose next time section has been set to the mute section in step 121.

In contrast, when the terminal whose next time section has been set to the section $T_{ON}$ exists, the base station determines whether a terminal whose current time section has been set to the mute section exists among terminals whose next time section has been set to the section $T_{ON}$ in step 111.

When a terminal whose current time section has been set to the section $T_{ON}$ exists in step 111, the base station allocates a maximum resource for the VoIP service of the next time section to the terminal whose current time section has been set to the section $T_{ON}$ in step 115.

In contrast, when a terminal whose current time section has been set to the mute section exists in step 111, the base station determines whether to allocate a minimum resource allocatable for the VoIP service to the terminal whose current time section has been set to the mute section in step 113. For example, the base station compares half of a resource allocated to the terminal whose current time section has been set to the mute section with a minimum resource allocatable for the VoIP service.

When the half of the resource allocated to the terminal is greater than the minimum resource allocatable for the VoIP service in step 113, the base station recognizes that the base station does not need to allocate the minimum resource for the VoIP service to the terminal. Accordingly, the base station allocates the half of the resource allocated to the terminal whose current time section has been set to the mute section to the terminal as a resource for the VoIP service for the next time section in step 117.

In contrast, when the half of the resource allocated to the terminal is equal to or less than the minimum resource allocatable for the VoIP service in step 113, the base station recognizes that the base station needs to allocate the minimum resource for the VoIP service to the terminal. Accordingly, the base station allocates the minimum resource allocatable for the VoIP service to the terminal as a resource for the VoIP service for the next time section in step 119.

After that, the base station ends the present process.

As described above, the base station allocates a resource for the VoIP service for the next time section of a terminal with consideration of mute section set information of a current time section and the next time section provided from the terminal. Accordingly, the terminal transmits the mute section set information of the current time section and the next time section to the base station as illustrated in FIG. 2.

Figure 2:
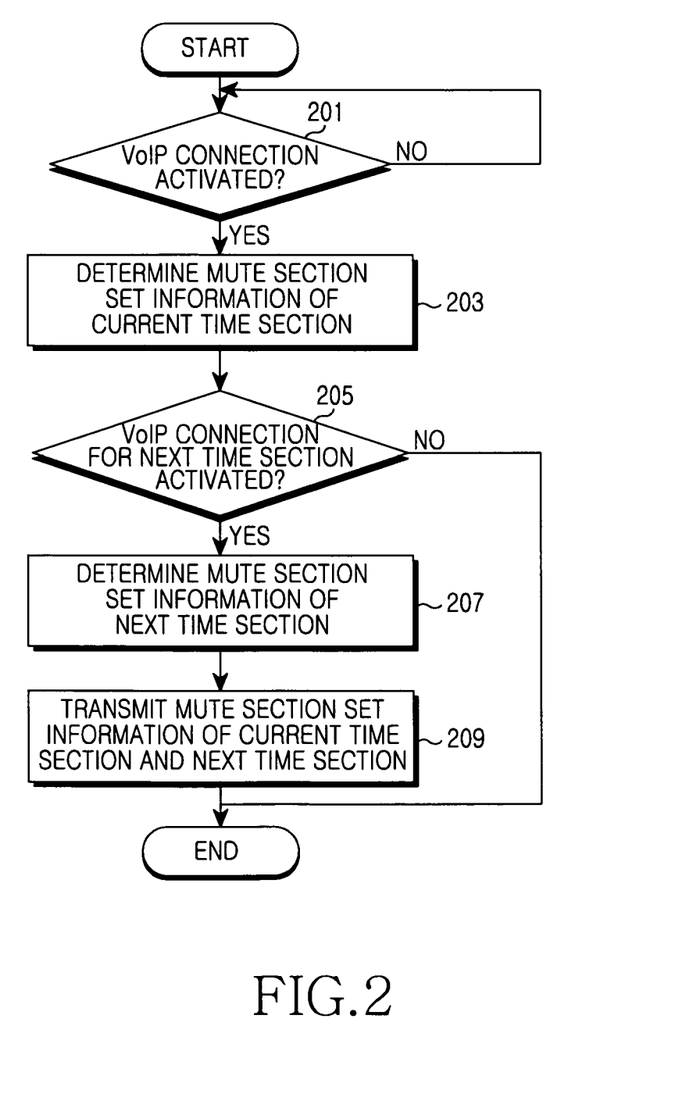
FIG. 2 illustrates a procedure for transmitting mute section information at a terminal that provides a VoIP service according to an exemplary embodiment of the present invention.

FIG. 2 illustrates a procedure for transmitting mute section information at a terminal that provides a VoIP service according to an exemplary embodiment of the present invention.

Referring to FIG. 2, the terminal determines whether VoIP connection with a serving base station is activated in step 201. That is, the terminal determines whether the terminal is selected as a terminal for providing a VoIP service according to scheduling of the serving base station. For example, the terminal determines whether VoIP connection is activated using an MAC header provided from the serving base station. For another example, the terminal may determine whether the VoIP connection is activated using a control message provided from the serving base station.

When the VoIP connection is not activated, the terminal ends the present process.

In contrast, when the VoIP connection is activated, the terminal determines mute section set information of a current time section that provides a VoIP service in step 203. That is, the terminal determines whether the current time section is a section $T_{ON}$ or a mute section $T_{OFF}$.

The terminal determines whether VoIP connection of the next time section is activated in step 205. For example, the terminal determines whether the VoIP connection of the next time section is activated using an MAC header provided from the serving base station. For another example, the terminal may determine whether the VoIP connection of the next time section is activated using a control message provided from the serving base station.

When the VoIP connection of the next time section is not activated, the terminal ends the present process.

In contrast, when the VoIP connection of the next time section is activated, the terminal determines mute section set information of the next time section in step 207. That is, the terminal determines whether the next time section is a section $T_{ON}$ or a mute section $T_{OFF}$.

After determining whether a mute section of the next time section is set, the terminal transmits mute section set information of the current time section and the next time section to the serving base station in step 209. For example, the terminal transmits the mute section set information of the current time section and the next time section to the serving base station using a residual bit of an MAC header. For another example, the terminal may transmit the mute section set information of the current time section and the next time section to the serving base station using a mute section control, message.

After that, the terminal ends the present process.

In the above exemplary embodiment, the terminal determines the mute section set information of the current time section, and then determines whether the VoIP connection of the next time section is activated.

In other exemplary embodiments, when the VoIP connection of the next time section is activated, the terminal may determine the mute section set information of the current time section and the next time section.

Hereinafter, a construction of a base station for allocating a minimum resource to a terminal during a mute section is described.

Figure 3:
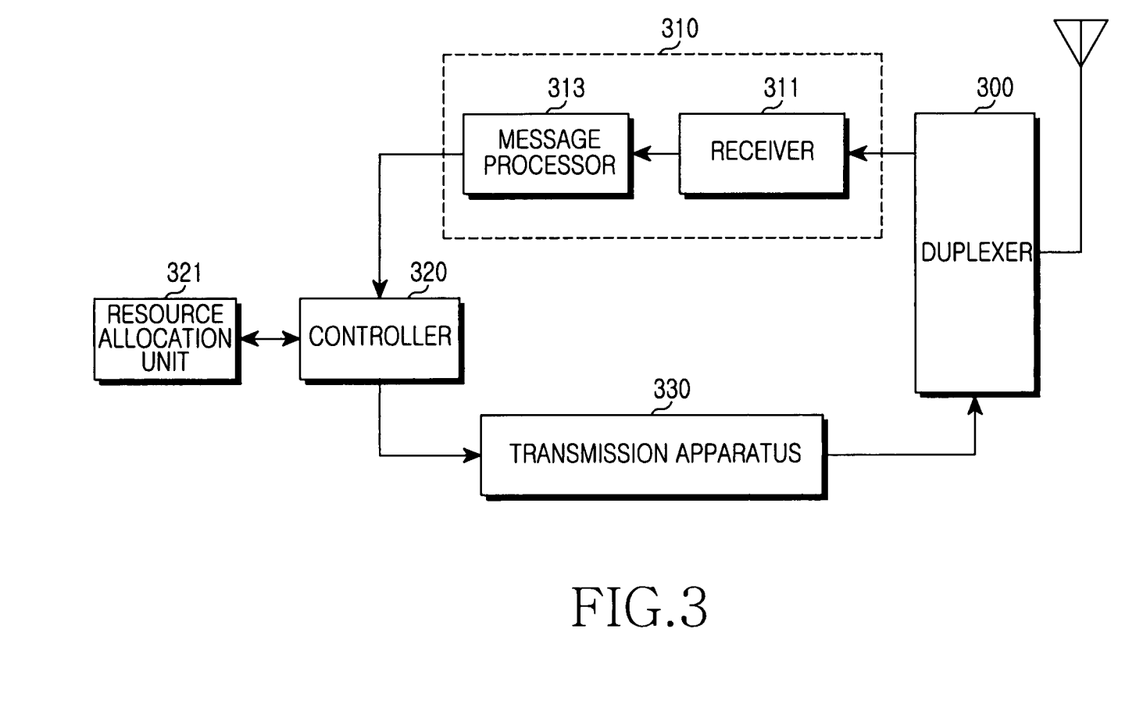
FIG. 3 illustrates a base station of a wireless communication system according to an exemplary embodiment of the present invention.

FIG. 3 illustrates a base station of a wireless communication system according to an exemplary embodiment of the present invention.

Referring to FIG. 3, the base station includes a duplexer 300, a reception apparatus 310, a controller 320, and a transmission apparatus 330.

The duplexer 300 transmits a transmission signal provided from the transmission apparatus 330 via an antenna, and provides a reception signal from the antenna to the reception apparatus 310 according to a duplexing scheme.

The reception apparatus 310 includes a receiver 311 and a message processor 313.

The receiver 311 converts a Radio Frequency (RF) signal provided from the duplexer 300 into a baseband signal. For example, the receiver 311 includes an RF processor and a demodulator. Here, the RF processor converts an RF signal provided from the duplexer 300 into a baseband signal. The demodulator demodulates and decodes a baseband signal provided from the RF processor.

The message processor 313 extracts a control signal from a signal provided from the receiver 311, and transfers the control signal to the controller 320. For example, the message processor 313 extracts mute section set information of a current time section and the next time section of a terminal, and transfers the information to the controller 320.

The controller 320 controls an overall operation of the base station, and selects a terminal for providing a VoIP service through scheduling. For example, the controller 320 selects a terminal for providing the VoIP service during the next time section through scheduling. At this point, the controller 320 transmits scheduling information to terminals selected through scheduling.

A resource allocation unit 321 allocates a minimum resource for the VoIP service to a terminal during a mute section according to the scheduling information of the controller 320 and mute section information of the terminal. For example, the resource allocation unit 321 determines mute section set information of a current time section and the next time section of the terminal provided from the controller 320. At this point, when the next time section of the terminal is set to a mute section, the resource allocation unit 321 does not allocate a resource for the VoIP service of the next time section to the terminal. In contrast, when a terminal whose current time section has been set to a section $T_{ON}$ exists among terminals whose next time section has been set to a section $T_{ON}$, the resource allocation unit 321 allocates a maximum resource for the VoIP service of the next time section to the terminal whose current time section has been set to the section $T_{ON}$.

In addition, when a terminal whose current time section has been set to a mute section exists among terminals whose next time section has been set to the section $T_{ON}$, the resource allocation unit 321 determines whether to allocate a minimum resource allocatable for the VoIP service to the terminal whose current time section has been set to the mute section. At this point, when half of a resource allocated to the terminal is greater than a minimum resource allocatable for the VoIP service, the resource allocation unit 321 recognizes that the resource allocation unit does not need to allocate the minimum resource for the VoIP service to the terminal. Accordingly, the resource allocation unit 321 allocates the half of the resource allocated to the terminal whose current time section has been set to the mute section to the terminal as a resource for the VoIP service during the next time section. In contrast, when the half of resources allocated to the terminal is equal to or less than the minimum resource allocatable for the VoIP service, the resource allocation unit 321 recognizes that the resource allocation unit 321 allocates the minimum resource for the VoIP service to the terminal. Accordingly, the resource allocation unit 321 allocates the minimum resource allocatable for the VoIP service to the terminal as a resource for the VoIP service during the next time section.

The transmission apparatus 330 converts data or a control signal to be transmitted to a terminal into an RF signal. For example, the transmission apparatus 330 includes a modulator and an RF processor. Here, the modulator encodes and modulates data or a control signal to be transmitted to a terminal. The RF processor converts an encoded and modulated signal provided from the modulator into an RF signal.

In the above construction, the controller 320 may perform a function of the resource allocation unit 322. Separate configuration of the resource allocation unit 322 in the exemplary embodiment of the present invention is for separately describing each function. Therefore, in actual realization, all or some of the functions of the resource allocation unit 322 may be processed by the controller 320.

Hereinafter, a construction of a terminal for transmitting information as to whether VoIP connection of a current time section and the next time section is activated to a serving base station is described.

Figure 4:
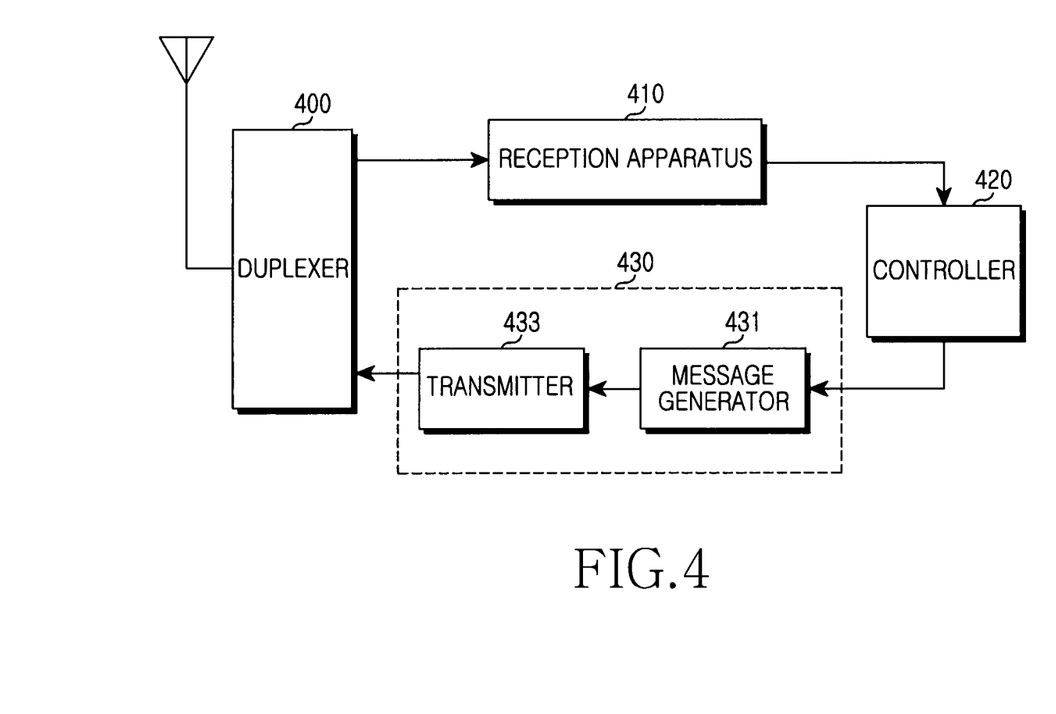
FIG. 4 illustrates a terminal of a wireless communication system according to an exemplary embodiment of the present invention.

FIG. 4 illustrates a terminal of a wireless communication system according to an exemplary embodiment of the present invention.

Referring to FIG. 4, the terminal includes a duplexer 400, a reception apparatus 410, a controller 420, and a transmission apparatus 430.

The duplexer 400 transmits a transmission signal provided from the transmission apparatus 430 via an antenna, and provides a reception signal from the antenna to the reception apparatus 410 according to a duplexing scheme.

The reception apparatus 410 converts an RF signal provided from the duplexer 400 into a baseband signal. For example, the reception apparatus 410 includes an RF processor and a demodulator. Here, the RF processor converts an RF signal provided from the duplexer 400 into a baseband signal. The demodulator demodulates and decodes a baseband signal provided from the RF processor.

The controller 420 controls an overall operation of the terminal.

When VoIP connection of the next time section with a serving base station is activated, the controller 420 controls to transmit mute section information of a current time section and the next time section to the serving base station.

The transmission apparatus 430 includes a message generator 431 and a transmitter 433.

The message generator 431 generates a control message including mute section information under control of the controller 420. For example, the message generator 431 adds mute section information of a current time section and the next time section to a residual bit of an MAC header. For another example, the message generator 431 may generate a mute section control message including the mute section information of the current time section and the next time section.

The transmitter 433 converts data to be transmitted to a base station or a control signal generated by the message generator 431 into an RF signal. For example, the transmitter 433 includes a modulator and an RF processor. Here, the modulator encodes and modulates data or a control signal to be transmitted to the base station. The RF processor converts an encoded and modulated signal provided from the modulator into an RF signal.

In the case of providing a VoIP service, a base station may determine the number of maximum users who can receive a VoIP service using Equation 1:

$$N_{M\_Algorithm} = \left(R_{TC} \times \frac{T_{VC}}{T_{MF}}\right) \times \frac{T_{ON} + T_{OFF}}{R_{ON} \times T_{ON} + R_{OFF} \times T_{OFF}} \quad [\text{Eqn. 1}]$$

where $N_{M\_Algorithm}$ is the number of maximum users accommodatable at a base station, $R_{TC}$ is total uplink capacity, $T_{VC}$ is a voice codec frame, $T_{MF}$ is an MAC frame, $T_{ON}$ is a section for substantially transmitting/receiving a VoIP packet, $T_{OFF}$ is a section that does not transmit/receive a VoIP packet, $R_{ON}$ is a band resource required by a section $T_{ON}$, and $R_{OFF}$ is a band resource required by a section $T_{OFF}$.

Figure 5:
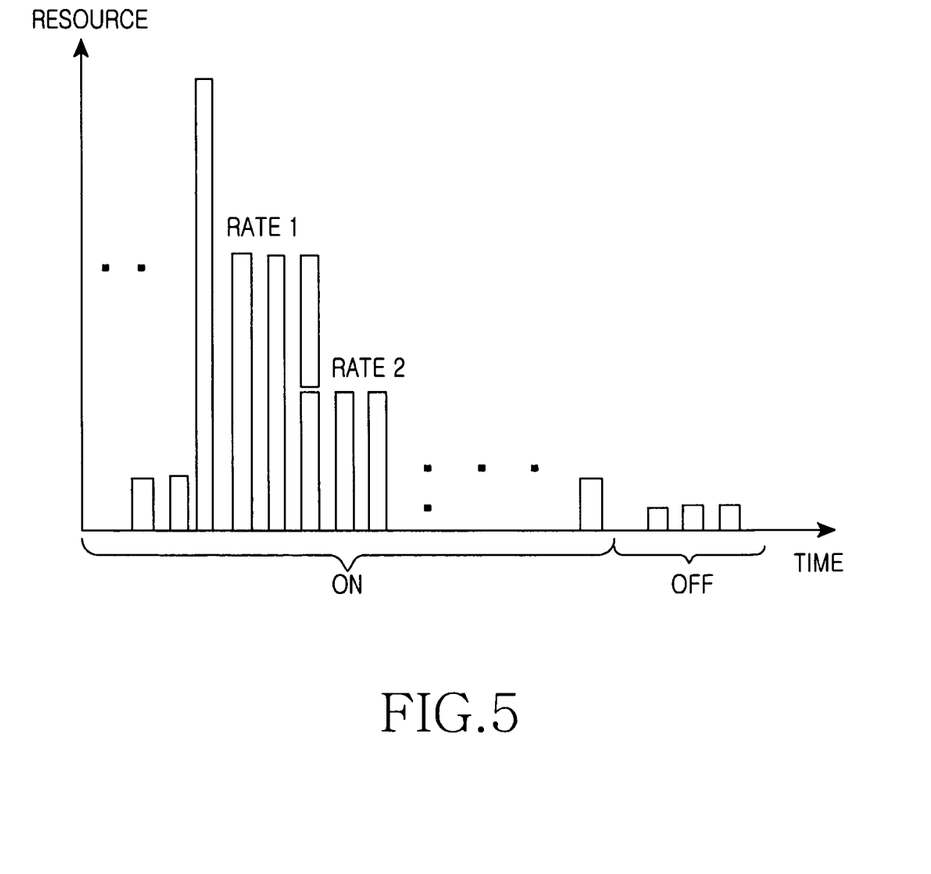
FIG. 5 illustrates a performance change according to an exemplary embodiment of the present invention.

A base station may allocate a resource such that a resource of a mute section (section $T_{OFF}$) is minimized as illustrated in FIG. 5.

FIG. 5 illustrates a performance change according to an exemplary embodiment of the present invention.

Referring to FIG. 5, a base station gradually reduces a resource for a VoIP service according to mute section set information of a current time section and the next time section of a terminal. Accordingly, the base station allocates a resource such that a resource of the terminal is set to a minimum resource for a VoIP service during a mute section.

As described above, in the case of setting a resource for a mute section (section $T_{OFF}$) to a minimum resource for the VoIP service, the base station may determine the number of maximum users who can receive the VoIP service using Equation 2:

$$N_M = \left(R_{TC} \times \frac{T_{VC}}{T_{MF}}\right) \times \frac{T_{ON} + T_{OFF}}{R_{VP} \times T_{ON}} \approx 114 \quad [\text{Eqn. 2}]$$

where $N_M$ is the number of maximum users accommodatable at a base station, $R_{TC}$ is total uplink capacity, $T_{VC}$ is a voice codec frame, $T_{MF}$ is an MAC frame, $T_{ON}$ is a section for substantially transmitting/receiving a VoIP packet, $T_{OFF}$ is a section that does not transmit/receive a VoIP packet, and $R_{VP}$ is a required band resource.

Figure 6:
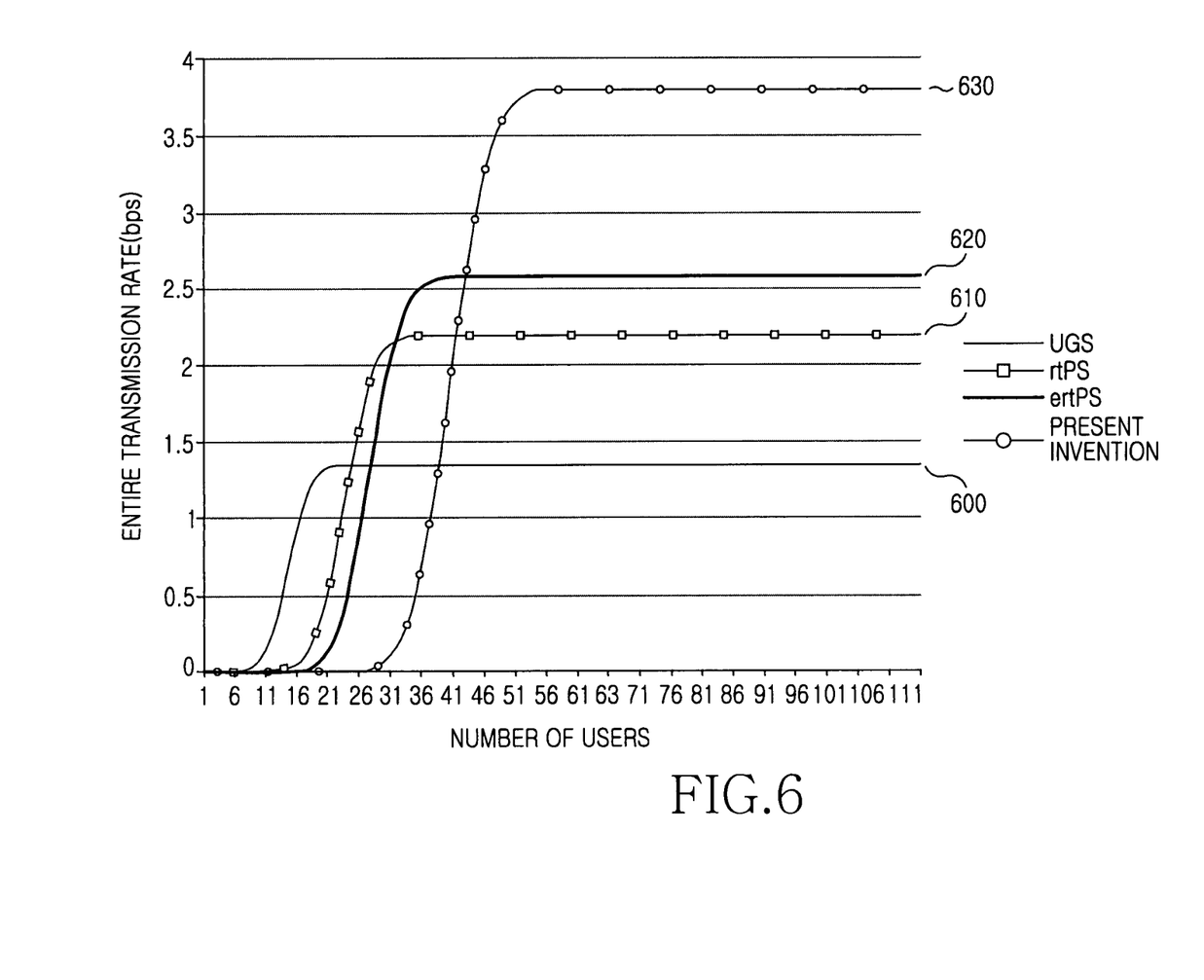
FIG. 6 illustrates a performance change according to an exemplary embodiment of the present invention.

Accordingly, in the case of allocating a minimum resource for the VoIP service as a resource of a mute section, the base station can raise an entire transmission rate as illustrated in FIG. 6 by providing the VoIP service to 1.5 times more users compared to a base station that does not control a resource of a mute section.

FIG. 6 illustrates a performance change according to an exemplary embodiment of the present invention.

Referring to FIG. 6, UGS 600, rtPS 610, and ertPS 620 represent scheduling methods that do not utilize a resource of a mute section, and the present invention 630 represents a scheduling method that utilizes a resource of a mute section.

As illustrated in FIG. 6, the scheduling method 630 that utilizes a resource of a mute section provides the VoIP service to more users by utilizing a resource of a mute section compared to the scheduling methods 600, 610, and 620 that does not utilize a resource of a mute section, so that an entire transmission rate may be raised.

In the case of performing uplink scheduling by utilizing a resource of a mute section as described above, a connection delay of a terminal may be expressed by Equation 3:

$$T_{M\_eertPS} = T_{UGS} \times \frac{1}{1 - P_{N_{M\_eertPS}}(n > N_{UGS})} \approx T_{UGS} \quad [\text{Eqn. 3}]$$

where $T_{M\_eertPS}$ is a connection delay of a terminal occurring when uplink scheduling is performed using a resource of a mute section, $T_{UGS}$ is a connection delay of a terminal occurring when a UGS scheduling method is used, $N_{UGS}$ is the number of maximum users who can receive a VoIP service when the UGS scheduling method is used, and $$P_{N_{M\_eertPS}}(n > N_{UGS})\_$$

is a probability that the number of users who receive the VoIP service in a section $T_{ON}$ according to an exemplary embodiment of the present invention is greater than $N_{UGS}$.

In the case of performing uplink scheduling by utilizing a resource of a mute section as in Equation 3, a connection delay of a terminal is generated similarly to the case where uplink scheduling is performed without utilizing a resource of a mute section.

As described above, a base station of a wireless communication system that provides a VoIP service may increase the number of users who can receive the VoIP service, and raise an efficiency of uplink resources by allocating a minimum resource to a terminal that provides the VoIP service during a mute section.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for allocating a resource at a base station of a wireless communication system that provides a Voice over Internet Protocol (VoIP) service, the method comprising:
   determining one or more terminals for providing the VoIP service during a next time section;
   determining mute section set information of a current time section and the next time section for the one or more terminals; and
   allocating an amount of a resource of the next time section to at least one terminal whose next time section is not set to a mute section, wherein the amount of resource of the next time section is based on whether the current time section is set to a mute section or not set to a mute section, and
   wherein the determining of the mute section set information comprises determining mute section set information of a current time section and the next time section of each terminal using a control message received from the one or more terminals.

2. The method of claim 1, wherein the determining of the mute section set information comprises determining mute section set information of a current time section and the next time section of each terminal included in a generic Media Access Control (MAC) header of a signal received from the one or more terminals.

3. The method of claim 1, wherein allocating of the amount of the resource of the next time section comprises:
   determining whether to allocate a minimum resource allocatable for the VoIP service to the at least one terminal; and
   when determining not to allocate the minimum resource, allocating an amount of a resource of the next time section to the at least one terminal when the current time section is set to a mute section such that the amount of the resource of the next time section is larger than the minimum resource.

4. The method of claim 3, further comprising, when determining to allocate the minimum resource, allocating a minimum resource for the VoIP service as a resource of the next time section of the terminal.

5. The method of claim 3, wherein the determining of whether to allocate the minimum resource comprises:
   comparing half of a resource allocated to the terminal during the current time section with the minimum resource allocatable for the VoIP service; and
   when the half of the resource is equal to or smaller than the minimum resource, determining to allocate the minimum resource to the terminal.

6. The method of claim 1, further comprising allocating a maximum resource for the VoIP service as a resource of the next time section to the at least one terminal when the current time section is not set to a mute section.

7. The method of claim 1, further comprising not allocating a resource of the next time section to the at least one terminal.

8. The method of claim 1, further comprising transmitting resource allocation information to the at least one terminal.

9. An apparatus for allocating a resource at a base station in a wireless communication system that provides a Voice over Internet Protocol (VoIP) service, the apparatus comprising:
   a receiver configured to receive a signal;
   a controller configured to determine one or more terminals for providing the VoIP service during a next time section, and determine mute section set information of a current time section and the next time section for the one or more terminals; and
   a resource allocation unit configured to allocate an amount of a resource of the next time section to at least one terminal whose next time section is not set to a mute section, wherein the amount of resource of the next time section is based on whether the current time section is set to a mute section or not set to a mute, and
   wherein the controller is configured to determine the mute section set information of a current time section and the next time section of each terminal using a control message received from the one or more terminals via the receiver.

10. The apparatus of claim 9, wherein the controller is configured to determine the mute section set information of a current time section and the next time section of each terminal included in a generic Media Access Control (MAC) header of a signal received from the one or more terminals via the receiver.

11. The apparatus of claim 9, wherein when half of a resource allocated to a terminal during a current time section is equal to or smaller than a minimum resource allocatable for the VoIP service, the resource allocation unit allocates the minimum resource to the terminal.

12. The apparatus of claim 11, wherein when determining not to allocate the minimum resource to the terminal, the resource allocation unit is configured to allocate an amount of a resource of the next time section to at least one terminal whose next time section is not set to a mute section and when the current time section is set to a mute section such that the amount of the resource of the next time section is larger than the minimum resource.

13. The apparatus of claim 11, wherein when determining to allocate the minimum resource to the terminal, the resource allocation unit is configured to allocate the minimum resource for the VoIP service to at least one terminal whose next time section is not set to a mute section and whose current time section is set to a mute section, as a resource of the next time section.

14. The apparatus of claim 9, wherein the resource allocation unit is configured to allocate a maximum resource for the VoIP service as a resource of the next time section, to the at least one terminal whose current time section and whose next time section have not been set to mute sections among the one or more terminals that are to provide the VoIP service.

15. The apparatus of claim 9, wherein the resource allocation unit does not allocate a resource of the next time section to the at least one terminal whose next time section has been set to a mute section among the one or more terminals that are to provide the VoIP service.

16. The apparatus of claim 9, further comprising a transmitter configured to transmit resource allocation information of the resource allocation unit to at least one terminal.

17. A method for transmitting mute section set information at a terminal of a wireless communication system that provides a Voice over Internet Protocol (VoIP) service, the method comprising:

determining whether VoIP connection with a serving base station is activated during a next time section;
when the VoIP connection with the serving base station is activated during the next time section, determining mute section set information of a current time section and the next time section; and
transmitting the mute section set information of the current time section and the next time section to the serving base station, wherein an amount of resource of the next time section is based on whether the current time section is set to a mute section or not set to a mute section, and
wherein the transmitting of the mute section set information of the current time section and the next time section to the serving base station comprises transmitting the mute section set information of the current time section and the next time section to the serving base station using a mute section control message.

18. The method of claim 17, wherein the transmitting of the mute section set information of the current time section and the next time section to the serving base station comprises transmitting the mute section set information of the current time section and the next time section to the serving base station using a generic Media Access Control (MAC) header.

19. An apparatus for transmitting mute section set information at a terminal of a wireless communication system that provides a Voice over Internet Protocol (VoIP) service, the apparatus comprising:
a controller configured to, when VoIP connection with a serving base station is activated during a next time section, determine mute section set information of a current time section and the next time section; and
a transmitter configured to transmit the mute section set information of the current time section and the next time section to the serving base station, wherein an amount of resource of the next time section is based on whether the current time section is set to a mute section or not set to a mute section,
wherein the transmitter is configured to transmit the mute section set information of the current time section and the next time section to the serving base station using a mute section control message.

20. The apparatus of claim 19, wherein the transmitter is configured to transmit the mute section set information of the current time section and the next time section to the serving base station using a generic Media Access Control (MAC) header.

* * * * *